March 23, 1948. C. E. EWING 2,438,266

TWO-SPEED DRIVE FOR PHONOGRAPH TURNTABLES

Filed March 18, 1947 4 Sheets-Sheet 1

INVENTOR
Charles E. Ewing,
BY Frank M. Slough,
His Attorney.

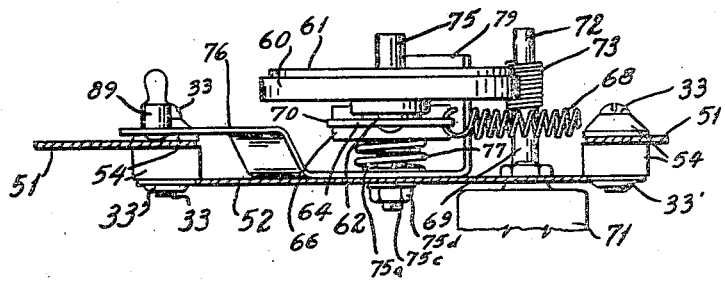
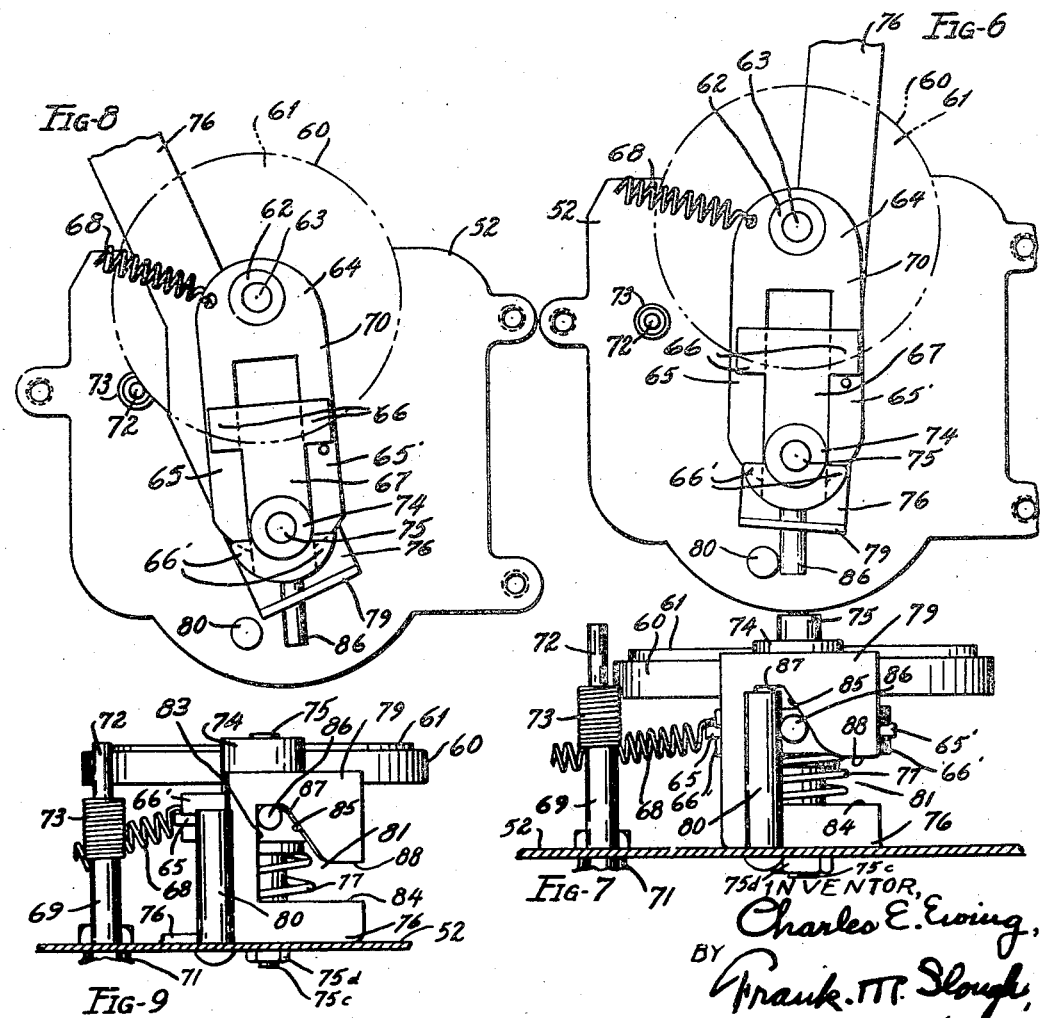

Patented Mar. 23, 1948

2,438,266

UNITED STATES PATENT OFFICE 2,438,266

TWO-SPEED DRIVE FOR PHONOGRAPH TURNTABLES

Charles E. Ewing, Elyria, Ohio, assignor to The General Industries Company, Elyria, Ohio, a corporation of Ohio Application March 18, 1947, Serial No. 735,461

14 Claims. (Cl. 74—193)

My invention relates to two-speed phonograph turntable drives and relates more particularly to an improved friction type driving mechanism employing a single idler wheel interposed between a motor driven roller and the inner surface of the turntable flange and relates more specifically to means for driving said idler wheel and thereby said turntable at a plurality of different speeds.

My present invention involves an improved form of friction type phonograph turntable driving mechanism whereby the friction wheel, while maintaining frictional engagement with an annular surface of a pendant turntable flange, may be alternatively adjusted to alternatively engage either of two roller steps disposed at different levels, said adjustment being, in every case, achieved by movement of a manually operable controller movable in a single uniform path to cause said idler wheel to be moved in proper sequence outwardly from a pre-engaged roller step, then vertically to the level of the other roller step, and finally, horizontally to engage the alternate roller step to vary the driving ratio between said roller and turntable.

An object of my invention is to achieve a change-speed operation in a friction drive mechanism of the type referred to, which will achieve the desired purpose in a simple, reliable, expeditious and effective manner.

Another object of my invention is to provide an improved mechanism for alternately moving a single idler wheel, which is disposed intermediately of the phonograph turntable flange and the driving roller whereby said idler wheel may be frictionally engaged with said flange and, alternately, with two superposed driving roller portions which are of different diameters.

Another object of my invention is to improve the apparatus disclosed in a copending application of Robert G. Metzner, Serial Number 666,313, filed May 1, 1946, now Patent No. 2,421,910, so as to effect a more positive adjustment movement to the idler wheel to shift the same from engagement with a driving roller step of one diameter to engagement with another roller step of substantially different diameter.

Other objects of my invention and the invention itself will be apparent to those skilled in the art to which my invention appertains by reference to the accompanying drawings, in which drawings.

Figure 1:
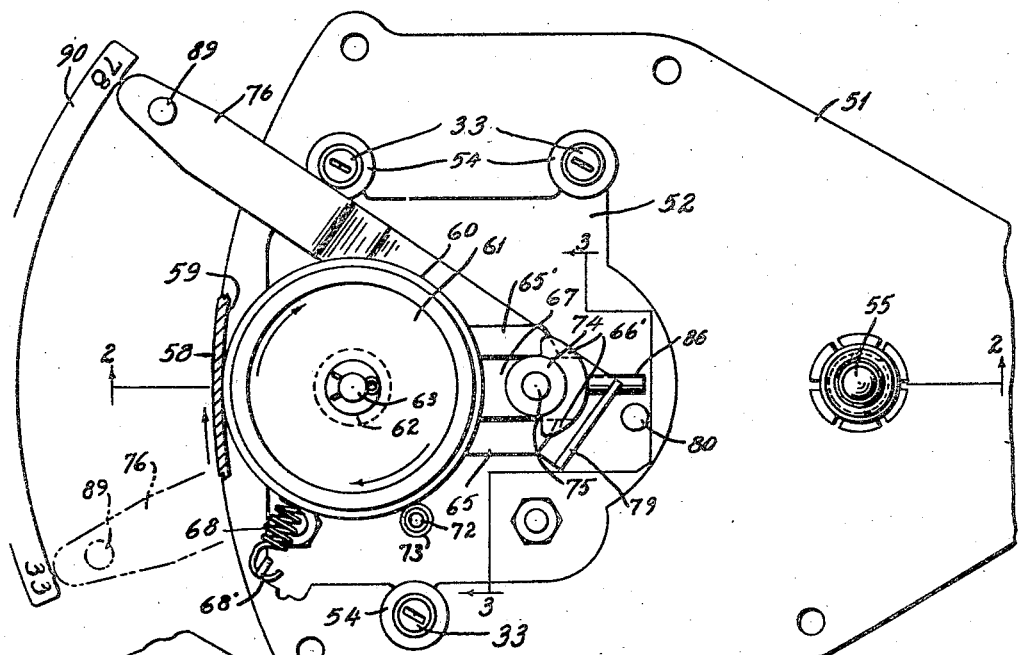
Fig. 1 is a top plan view of an embodiment of my invention secured to a mounting plate exposed to view by assuming the cutaway of all other portions of a superposed turntable from a remaining mere fragment of its pendant flange portion, the latter being shown as engaged by the idler wheel of the said embodiment, an end portion of said mounting plate also being broken away.
Figure 4:
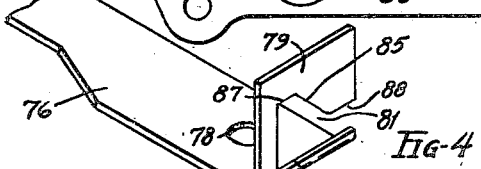
Figure 2:
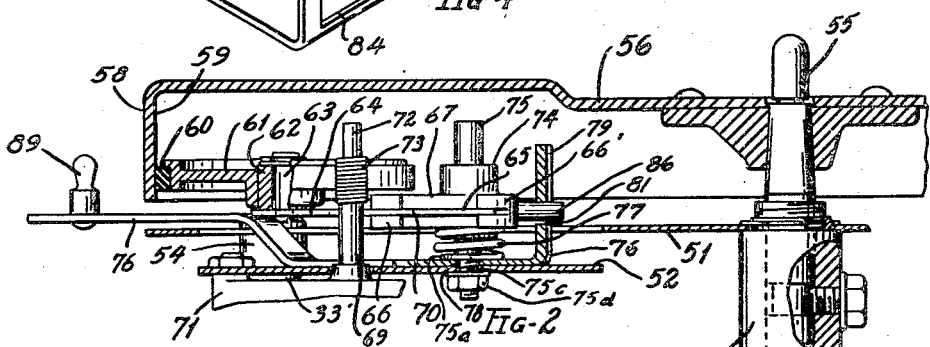
Fig. 2 is a section taken on the line 2—2 of Fig. 1.
Figure 3:
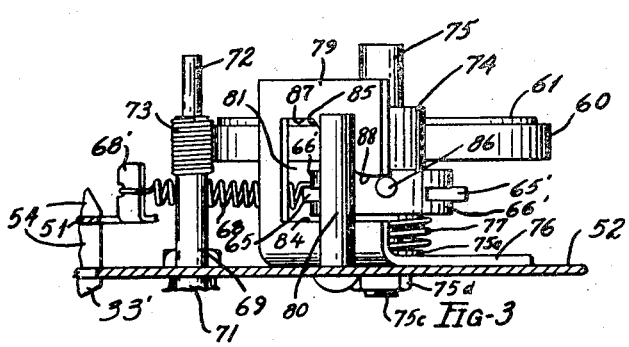
Fig. 3 is a side elevational view of certain of the apparatus illustrated in plan in Fig. 1, the view being taken on the step line of section 3—3 of Fig. 1, a showing of the turntable being omitted.
Figure 10:
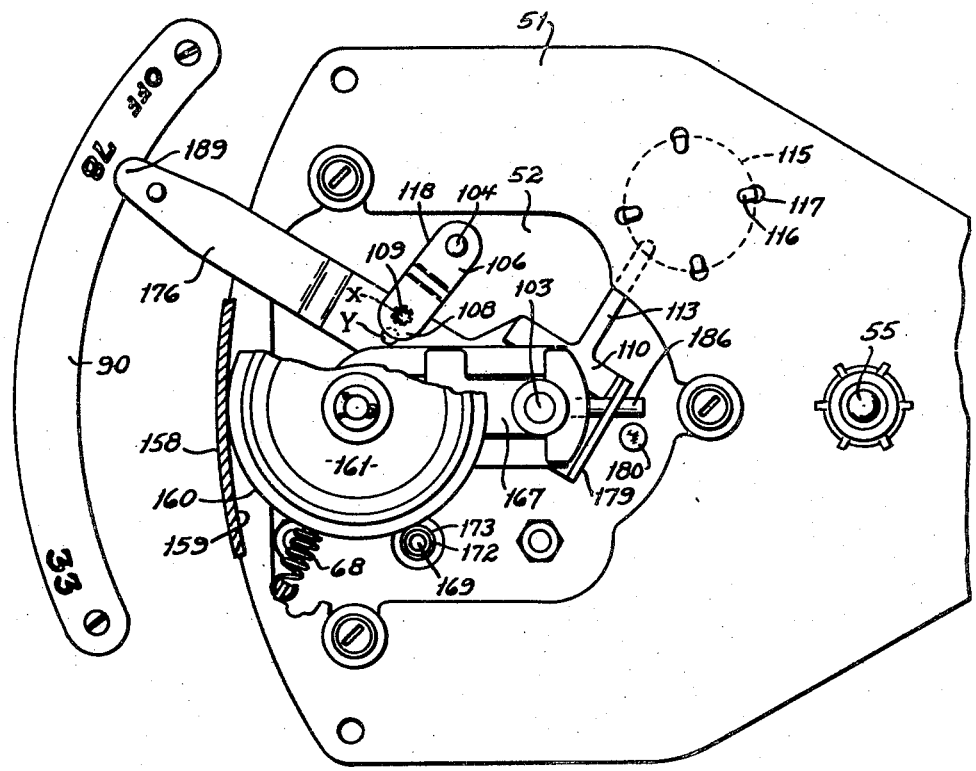
Figure 11:
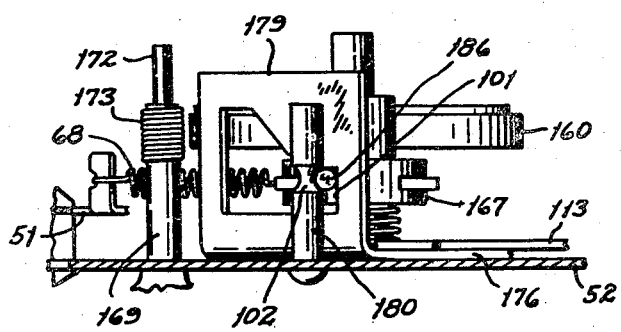
Figure 12:
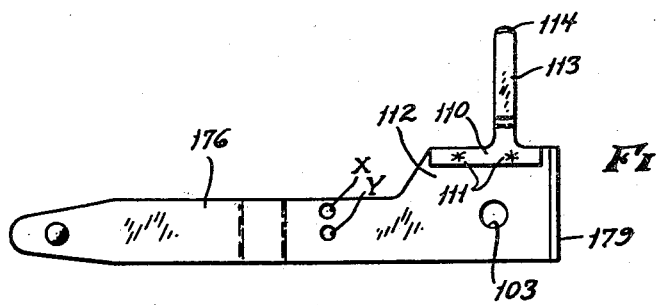
Figure 14:
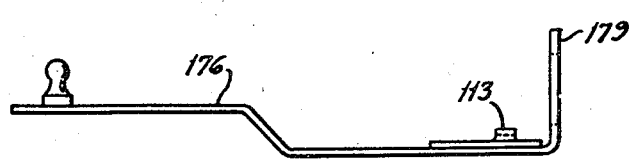
Figure 13:
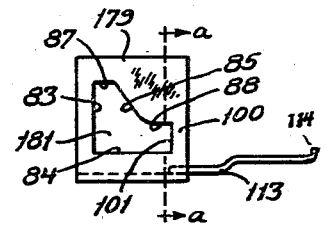
Figure 18:
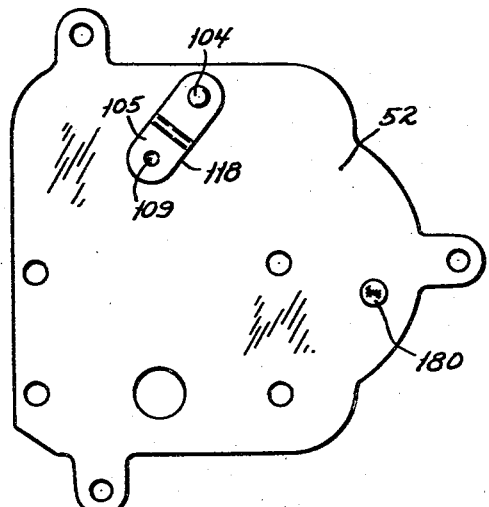
Figure 15:
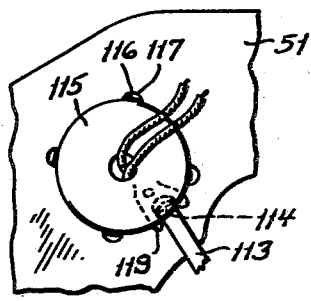
Figure 17:
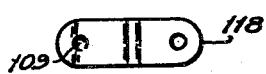
Figure 16:
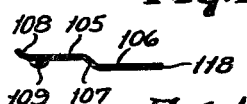
Figure 19:
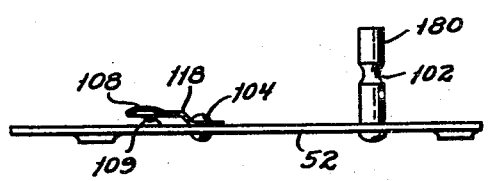

Figs. 1, 2, and 3 illustrate the idler friction wheel in a relatively lowermost adjusted position to simultaneously engage the larger step of the motor driven driving roller and the inner annular surface of the turntable flange;

Fig. 4 illustrates a perspective view of a fragmentary portion of a manually operable controller lever and a cam element thereof;

Fig. 5 is a view of the mechanism of the foregoing Figs. 1, 2, and 3 with the parts in the same adjusted position, the view being taken from another side of the apparatus, and, like Fig. 3, the showing of the turntable being omitted;

Figs. 6 and 7 are, respectively, top plan and end elevational views of the apparatus of the foregoing figures with the parts assuming the midway position occasioned by movement of the manual controlling lever of the foregoing figures, from the position indicated by the numeral 78 midway to the position shown by dotted lines in Fig. 1 designated by the numerals 33, said numerals, in each case, representing two common respectively high and low turntable speeds;

Figs. 8 and 9 are views, respectively, similar to Figs. 6 and 7, with the exception that the parts are illustrated in the positions they assume when the operating lever of Fig. 1 is swung to the position indicated by the numeral 33;

Fig. 10 is a view corresponding to that of Fig. 1 but of a second embodiment of my invention;

Fig. 11 is a side elevation, corresponding to Fig. 3, of certain of the parts of Fig. 10;

Fig. 12 is a plan view of a hand lever which, in Fig. 10, is substituted for that of Fig. 4;

Fig. 13 is an end elevational view of the cam flange portion of the hand lever of Fig. 12;

Fig. 14 is a side elevational view of the lever of Figs. 12 and 13;

Fig. 15 is a bottom plan view of an electric switch and a switch operating arm employed in the embodiment of Fig. 10;

Figs. 16 and 17 are, respectively, a side elevational and a plan view of a leaf spring employed in the said second embodiment;

Figs. 18 and 19 are, respectively, plan and side elevational views of a supplemental mounting plate employed in said second embodiment and showing a frictional spring detent and an upstanding abutment post, both secured to the upper side of said plate.

Referring now to the drawings, and first, particularly to Figs. 1 to 9 inclusive, illustrating a preferred form of my invention, the main supporting plate 51 is of sheet metal and a supplemental plate 52 is pendantly supported from the main plate by three machine screws 33, thereby affording a three point suspension for the plate 52, said mounting screws 33 being insulated from metallic contact with the plate 51, by tubular rubber sleeves 54, in accord with present day common practice to prevent the transmission of tonal vibrations from the mechanisms carried by said plate 52 through a turntable supported record disc to the reproducing stylus of the phonograph.

The turntable 56 may be carried on the post 55 in any well known manner and preferably the post 55 is journalled in a bearing tube 57 for free frictionless rotation. The turntable is preferably provided with a pendant flange 58 having a smooth cylindrical inner surface 59 with which the rubber peripheral tread 60, of the idler wheel 61, is frictionally engaged whereby rotation of the idler wheel may drive the turntable at a speed determined by the rate of rotation of said idler wheel.

The hub of the idler wheel 61 is provided with a bearing sleeve 62 drive fitted therein, said sleeve being journalled on an upright post 63 rigidly secured at its lower end to the yoke portion 64 of a U-shaped slide element, generally indicated at 70, said slide element having a pair of parallel arms 65 and 65' which make bearing fitting engagement within slideways afforded by notches laterally directed inwardly from the ends of the arms 66 and 66' of a mount element 67, in the manner disclosed in the copending application for patent of Herbert L. Hartman, Ser. No. 550,995, filed August 24, 1944, now Patent No. 2,438,265.

The oppositely extending pair of mount arms 66 and the oppositely extending parallel arms 66', are relatively interspaced in the longitudinal direction of extent of the slide arms 65 and 65', and, with said slide arms disposed within the slots of said mount arms, the entire slide element 70, which, by its yoke, carries the idler wheel post 63 and idler wheel 61, may be moved longitudinally of the arms guided by the above designated slideway, subject to the restrictions imposed upon such movement by the tensile spring 68 and any engagement had by the periphery of the idler wheel 61 with the turntable flange 58 and also with the driving roller carried by the shaft 69 of the driving motor 71.

The stepped driving roller may, if desired, be formed separately from the shaft 69, but preferably said roller is afforded by providing the shaft with a reduced end 72 and a diameter increasing layer of tightly helically wound spring wire 73, said reduced end 72 affording a driving roller end portion of least diameter, which is uppermost, and the outer surface of a closed helical coil of spring wire 73 which may be soldered onto the shaft 69 at a lower level, conveniently affords a driving roller portion of relatively greater diameter than does said reduced shaft end 69. The outer surfaces of said end 72 and said coil 73, thus together provide a two-step driving roller.

The idler wheel mount 67 is provided with a hub 74, having a cylindrical bore, and is journalled upon a relatively longer upstanding post 75 by a bearing fit, to permit said mount hub to be rotationally and longitudinally reciprocated on said post 75. The lower portion of the post 65 is provided with an enlarging radial flange 75a and terminates in a reduced threaded end 75c which is extended through an aperture of the sub-plate 52, whereby the post is rigidly secured by the nut 75d to said sub-plate.

The portion of the post 75, disposed between the sub-plate 52 and the post flange 75a, is of such smaller diameter and of such length that it may loosely be projected through an aperture of the controlling lever 76, an intermediate portion of which is loosely disposed between said post flange and said sub-plate.

For adjusting the idler wheel to its various adjusted positions, the hand lever 76 is superposed on the plate 52, being telescoped by its aperture 78, over the post 75, and a helical spring 77, also telescoped over the post 65, is compressively disposed between the upper surface of said lever 76 and the portion of the underside of the mount 67 which borders said mount hub.

The hand lever 76 has a free end of the long arm of the lever 76 which extends outwardly below the turntable flange 58, as shown in Fig. 2, and is provided with an upstanding handle 89 adapted to be grasped by the operator for the purpose of swinging the lever 76 about the axis of the post 75 to present said free end in proximity to either of the indicia 78 or 33 placed upon a plate or other element 90 mounted upon the phonograph cabinet, not shown in the present drawings.

The shorter arm of the lever 76 terminates in an upstanding flange 79 which is so cut as to provide a notch 81 to afford three substantially parallel edge surfaces 84, 87 and 88, the parallel surfaces 84 and 87 being more widely interspaced than the surfaces 84 and 88, there being also a diagonal edge portion 85 interconnecting the horizontal portions 87 and 88, said diagonal portions being disposed at preferably an angle of between 30° and 35° to the planes of the said horizontally extending edges.

The angle of inclination of the edge 85 may, of course, be varied with corresponding variation in the required amount of throw of the handle portion of the lever 76.

Disposed in cooperative position to the slot edges 87, 88 and 85, the first two of which provide land surfaces for the camming surface 85, is a cam follower in the form of a preferably cylindrical stem 86 which is preferably secured to and affords a rearward extension of the idler wheel mount 67, said stem 86 affording a cam follower adapted to be cammingly moved to different lateral positions and to different levels as a result of lateral translatory movements of the camming lever flange 79.

In the apparatus of my invention the post 80, which is adapted to be engaged with the stem cam follower 86, performs a very important function in insuring the proper degree of lateral swinging movement and the proper degree of upward movement of the mount 67 and the wheel 61, at the proper times, and at the same time insures that proper relative amounts of such movements are achieved under all operating conditions.

I have found that the use of such an abutment post ensures that the adjustment operation, particularly when shifting from the low speed driving arrangement to the high speed driving arrangement, accomplishes greater positiveness in the change speed operation and ensures that the peripheral rubber tread of the idler wheel is not at any time subjected to an abrasive rubbing when passing over the upper corner of the lowermost larger driving roller step; at the same time, the provision of such an abutment post achieves the desirable result of accomplishing repeated uniform movements of the idler wheel whether or not the manually adjustable lever handle 89 is swung rapidly or slowly.

Rotational movement of the mount 67 about the post 75 in the clockwise direction is opposed by the tension spring 68 which interconnects the free end of the slide 70 adjacent the idler wheel post 63 and a fixed portion of the main frame 51, shown at 68', in Fig. 1, said spring being so disposed as to constantly exert a pull upon the mount 67 tending to rotate it in the counterclockwise direction.

For purposes of description and in the claims, I may hereinafter refer to the formation of the surface comprising the upper and lower lands 87 and 88 with the intermediate inclined surface 85 as being in a substantially "lazy Z" form, the characterising word "lazy" applied to a letter of other character having antecedently been employed on the cattle ranges of this country in a similar manner to denote cattle brands. Therefore, herein in referring to the "lazy Z" surface formation, I intend the word "lazy" to distinguish from the normal form of the letter "Z" by making the angles formed by the junction of the vertically extending portion and with the horizontal ends obtuse angles instead of acute angles.

It is noted that thce "lazy Z" form is best recognized when looking at the element 79 in a direction opposite to that as shown in such drawings as those of Figs. 7 and 9 wherein the form would seem to be that of a reversed "lazy Z." The meaning therefore of the term "lazy Z" in the present claims is to be determined by the foregoing explanation.

The following description of the method of operation of the change speed adjustment mechanism of the embodiment of my invention, disclosed in the drawings, as based upon the assumed initial position of the parts, as illustrated in Figs. 1, 2, and 5, wherein the mount stem 86 is in engagement with the lower land edge surface 88, and the lever handle 89 is at the position, indicated by the indicia "78" on the plate 90 in Fig. 1, and the rubber tread periphery 60 of the idler wheel 61 is in simultaneous engagement with the inner surface of the turntable flange 58 and the outer surface of the larger step 73 of the stepped motor shaft roller, and with said wheel constrained to such engagement by the retractive effort of the spring 68.

Consequently, the motor being operated in any usual manner, the driving roller step 73, which is frictionally engaged with the tread 60 of the idler wheel, will rotate the idler wheel in the clockwise direction of the arrow, shown on said wheel in Fig. 1, and consequently, by virtue of the engagement between the idler wheel tread and the inner surface 59 of the turntable flange, the turntable 56 will also be rotated in a clockwise direction at a speed which, for instance, may be 78 R. P. M. or other relatively high speed, which is predetermined by the speed of the motor and the diameter of the larger driving roller step 73.

When the idler wheel is then adjusted, by moving the lever 76 to place its handle 89 adjacent the indicia "33," Fig. 1, by virtue of the operation of the camming elements associated with the upstanding flange of said lever, as later described, the idler wheel is positioned, as illustrated in Fig. 9, with the peripheral rubber tread 60 of the idler wheel in engagement with the smaller step 72 of the driving roller, to rotate the idler wheel and the idler-engaged turntable 58 in the same clockwise direction as before, but at a much slower speed, such as 35 R. P. M. which lower speed is in proportion to the smaller diameter of the roller step 72, relative to that of the larger roller 73.

The apparatus comprising the flange cam 74 and cam follower 86, with the other ancillary cooperative elements, whereby the idler wheel is adjusted from either of the above operative positions to the alternate position, will now be described.

When the parts are in the high speed driving position, as shown in Figs. 1, 2, 3, and 5, should the operator move the handle 89 of the controlling lever 76 in the counterclockwise direction, as illustrated in Fig. 1, by virtue of the upward pressure exerted by the compression spring 77 against the underside of the idler carrier mount 67, the lever flange 79 will be moved successively from the position shown in Fig. 3 through the position shown in Fig. 7, and ultimately, to the position shown in Fig. 9.

Such counterclockwise movement of the lever flange 79 about the axis of the post 75 will permit the mount stem to pass from under the lower straight edge land surface 88 and by virtue of upward pressure exerted upon the mount by the spring 77, to be lifted upwardly along the diagonal camming surface 85 to engagement with the upper land surface 87, as shown in Fig. 9.

During most, if not all, of the upward portion of such movement, the mount stem 86 will make simultaneous engagement with the diagonal camming surface 85 and the outer surface of the post 80, being permitted to rise only as the diagonal edge surface 85 is moved laterally to widen the angular distance between said diagonal surface edge and the erect post 80.

As shown best in Fig. 6, which shows the illustrated parts in an intermediately adjusted position, the lateral component of the effect of the edge 85 is sufficient to cause such lateral swinging of the idler wheel post 63 about the axis of the mount post 75, as to move the periphery of the idler wheel 61 outwardly beyond the peripheral extent of the larger idler wheel step 73.

The first operative effect of counterclockwise movement of the handle 76, Fig. 1, is to move the periphery of the idler wheel 61, indicated in dotted lines, Fig. 6, outwardly from engagement with the larger step 73 of the stepped roller, such lateral movement being accompanied by an upward movement of the idler wheel 61 from the level indicated in Fig. 3 to a level indicated in Fig. 7.

The continuing adjusting movement of the lever handle portion 89 towards the indicia 33, causes the diagonal cam surface 85 to move towards the right, as viewed in Fig. 7 and thereby permits the mount stem 86 to continue its rising movement in a vertical direction, being guided by lateral engagement of said stem with the post 80 until all parts of the idler wheel periphery 60 have been elevated to the level of the uppermost and smaller roller step 72.

When the cam flange 79 has moved nearly to the approximate position shown in Fig. 9, wherein the idler wheel 81 is at the level of the uppermost roller step 72, in engagement with the land surface 87, continuing movement of the lever flange 79 causes the stem 86 to be engaged by and to be moved by the end edge surface 83 of the cam notch 81, to swing the mount 67 in a counter-clockwise direction whereupon the periphery of the idler wheel will be moved inwardly to engage the small step 72 of the driving roller, as shown in Fig. 8.

It is to be understood throughout the foregoing description that Figs. 6 and 7 show the same intermediate adjusted position of the parts, and that Figs. 8 and 9 alike illustrate a different further adjusted position of said parts, during the period when the lever 76 is being swung from the "78" indicated position toward the "33" indicated position.

With the parts in their final adjusted position, as shown in Figs. 8 and 9, the small uppermost driving roller 72 is engaged with the periphery of the idler wheel 61, and the longitudinal and lateral pulling components of the force exercised by the spring 68 will, at all times, be sufficient to maintain the periphery of the idler wheel in engagement both with the inner surface of the turntable flange, and the lateral surface of the smaller step 72.

From the foregoing description, the reverse adjustment operation will be readily understood, such adjustment being effected by moving the handle 89 of the lever 76 in the clockwise direction from the indicia "33" to the indicia "78" and, in such case, the camming flange 79 will be moved in the counterclockwise direction, as viewed in Figs. 8 and 6, from the position shown in Fig. 8, first, to the position shown in Fig. 6, and continuously proceeding to the position shown in Fig. 1.

In such adjustment the first movement of the camming flange 79 towards the left, as viewed in Fig. 9, and clockwise in Fig. 8, will be to bring the diagonal camming surface 85 in engagement with the mount stem 86 and thus exert a lateral and downward thrust on the mount stem 86, and thus to bring it into engagement with a side of the stationary post 80 whereupon, as shown in Fig. 6, the peripheral tread of the idler wheel 61 will again have taken a position laterally beyond the peripheral extent of both roller stepped portions 72 and 73, and then, while said tread is laterally spaced beyond the periphery of both said roller steps, the camming surface 85 will force the mount stem 86 downwardly against the guiding engaged outer surface of the stationary post 80 until the stem can pass laterally along the curved portion of the diagonal edge surface and into engagement with the continuing horizontal lower surface 88.

Thus, the stem 86 will move laterally along the surface 88 under the inducing pressure of the tensile spring 68, whereupon the tread of the idler wheel having previously been lowered to the level of the larger driving roller 73, will be resiliently pressed inwardly in a horizontal direction to engagement with said larger driving roller surface.

It will thus be seen that, by the instrumentalities comprising the notched lever flange 79, the stem 86, post 80 and the springs 77 and 68, by a simple uniform movement of the lever handle 89, the idler wheel is moved first horizontally outwardly, from a precedently engaged roller step, and then moved vertically to the level of the alternate roller step, and then is moved horizontally inwardly to engage said alternate driving roller step, thus avoiding any snap-over destructive rubbing of the idler wheel tread by the upper edge of the larger step.

The second embodiment of my invention, of Fig. 10 et seq. involves certain features of improvement residing in the provision in a form of cam flange 179, to be substituted for flange 79, and abutment post 180 of different form than the post 80 means associated with a hand lever 176 adapted to permit adjustment of said hand lever to a neutral position where driving of the turntable is discontinued, the same comprising means for actuating an electric switch to interrupt the motor circuit when said hand lever is adjusted to said neutral position.

Referring to the different figures of drawing illustrating the said second embodiment, and in all of which like parts are designated by like reference characters, the cam flange 179 thereof is in the form of a rectangular plate having an aperture 181 which differs from the cam slot 81 in the foregoing embodiment only in that the aperture 181 is entirely confined by border portions of the plate including an added portion 100, which starts at the line a—a, Fig. 13, and extends in the direction of the arrows.

The portion 100 affords an inwardly facing edge 101, which, when the hand lever 176 is swung in the clockwise direction as viewed in Fig. 10 to present its outwardly extending handle end 189 to the indicia "Off," will engage the cam follower rod 186 to swing the mount 167 in the clockwise direction.

Thus the idler wheel 161 is caused to disengage its periphery 160 from the lower drive roller step 173, the tread 160 of the idler wheel meanwhile remaining engaged with the inner surface 159 of the turntable flange 158.

Fig. 11 illustrates an outer side elevational view of the cam flange plate 179, together with the modified post 180 disposed in front thereof, and the mount stem 186 moved by the cam flange edge 101 to a position where the end portion of the stem is projected within the annular groove 102 of the abutment post 180.

The groove 102 reduces the diameter of the medial portion of the post 180, in the horizontal plane occupied by the stem 186 when the idler wheel has been adjusted to the high speed drive position at which time the periphery of said idler wheel is engaged with the lowermost larger step 173 of the driving roller, thereby permitting the hand lever 176 to be swung from the 78 R. P. M. position to the 'off" position.

It is obvious that since the "off" position is disposed beyond the 78 R. P. M. position with respect to the 33 R. P. M. position, that whenever the hand lever is employed to adjust the mechanism, from the 33 R. P. M. driving position, to the neutral or "off" position, the clockwise movement of the lever, as from the 33 R. P. M. position, will necessarily intermediately adjust the mechanism momentarily to the 78 R. P. M. position.

To ensure retention of the hand lever 176 in either the 78 R. P. M. position or in the "off" position, said lever 176, in a portion disposed below the turntable and also below the turntable and idler wheel is provided with a pair of apertures x and y which are located in transverse relatively interspace relation to each other, and both being equidistant from the axis 103 about which the idler wheel mount 167 is adapted to be adjustably swung.

A leaf spring 118 is secured by its base portion 106 to the supplemental plate 52 by a rivet 104, and its free end comprises an offset portion 107 and a free end portion 105, said latter portion having upturned tip 108 and a downwardly presented rounded button portion 109, disposed intermediate the portions 105 and 108.

The lever 176 when swung in the clockwise direction will first laterally engage the lower convex curved tip 108 of said spring and then will engage the button 109 to cam the spring upwardly until the button 109 rides over the upper surface of the lever.

Continued lever movement permits the button 109 to first be snapped downwardly into the aperture x, at which time the hand lever is in the 78 R. P. M. position. Continued clockwise movement of the lever 176 will then cause the button 109 to be cammed out of the aperture x, and will frictionally engage the upper surface portion of the lever until said button is snapped downwardly into the second aperture y of said hand lever, the button being resiliently constrained to a downward position as a result of the form of the spring, its upward deflection by the lever, and its inherent resiliency.

The button 109 is snapped into the aperture y at the moment that the handle end of the lever 176 is pointed to the indicia "Off."

With the button 109 spring pressed into either of the lever apertures x or y, the fit between the button and the walls of such aperture will exercise a sufficient restraint upon the movement of the lever in either direction to prevent undesired movement of said lever, but without offering too much resistance, to manually adjust movement of the lever so that the lever can easily be shifted to any of the three adjustment positions.

It will be understood that with the exception of the details above recited, and other described functional effects, that the two-speed drive apparatus of my said second embodiment operates in the same manner as that of the described first embodiment.

Inasmuch as movement of the lever 176 to the neutral position signifies the adjustment of the apparatus to a non-operating or non-driving position, I have provided additional means comprising an extension member 110 which is riveted or welded at the point 111 to the portion 112 of the lever 176, said member 110 comprising an arm 113 having an end 114 which, when the lever is swung to the neutral position, will be swung on a radius on the center 103 to operate an electric switch 115 which is pendantly supported by tongue portions 116 of its casing which are projected upwardly through apertures 117 of the base plate 51. The switch 115 may be of any design construction and preferably comprises a switch lever 119 of some sort, which is disposed in the path of the lever arm 113 whereby, when said lever arm is moved in the clockwise direction around the center 103 to the neutral position of the end of the lever 176, the switch will operate to break a pair of contacts which are interposed in the energizing circuit of the electric motor upon whose shaft 169, the step driving roller, 172—173, is secured.

It will be understood that when the lever 176 is moved in the opposite counterclockwise direction from the neutral position, that before said lever is moved to the 78 R. P. M. position, said switch contacts will be reclosed by the retracting movement of the lever arm 113 in the counterclockwise direction.

In conclusion, the second embodiment of my invention affords a neutral position for the adjustment lever 176 whereat said lever will maintain the periphery of the idler wheel out of contact with either driving roller step, and at said neutral position the arm 113 of said lever 176 will maintain the energizing circuit of the motor broken to de-energize the motor.

To restart the motor and restore the idler wheel to the proper position to drive the turntable at either of the two speeds 33 R. P. M. or 78 R. P. M., the lever is merely moved to the desired indicating position therefore, and the act of moving the lever from this said neutral position will affect re-energizing of the motor.

The provision of the switch 115 increases the effective life of the motor and of the other parts moved thereby, and the removal of the idler wheel tread 160, which commonly is made of rubber, from spring-pressed engagement with the roller 172—173, will prevent deforming of the peripheral surface and the tread which otherwise occurs when the idler wheel is left in such engagement with said roller over a considerable interval of time. It has been found that such pressure engagement in the course of time makes the peripheral surface of the idler wheel irregular, and at each rotation of the idler wheel engagement on each and every such deformed portion of its tread, that the driving roller will cause an irregularity in the speed of the turntable and cause an indisputable thumping noise, which, of itself, is most unpleasant to the ear.

Having described my invention in two different embodiments, I am aware that numerous and extensive departures may be made from the embodiments of my invention herein illustrated but without departing from the spirit of my invention which essentially comprises the combination of an abutment element of which the post 80 is a preferred form in combination with the swingable cam element 85 and a projection preferably in the form of the stem 86 affording a cooperative cam element in a change speed mechanism, of which the Metzner type is a preferred form.

I claim:

1. In a change speed adjustment mechanism for two-speed phonograph turntable drives of the type described, the combination with an upright motor driven roller having a pair of superposed friction driving steps of different diameters, a friction wheel rotatable on a vertical axis adapted to alternately peripherally engage and be driven by one or the other of said steps, a laterally and vertically movable mount for said wheel, a first spring continuously exerting pressure tending to move said mounted wheel towards peripheral engagement with that roller step which at the time is disposed at the same level as said wheel, means for adjusting said wheel mount laterally beyond said steps and from the level of either of said steps, said adjustment means comprising a laterally movable cam element adapted to be moved laterally in a continuous uniform path, a projection of said wheel mount being disposed in the path of movement of said cam element and affording a cam follower therefor, and a relatively stationary abutment member having an upwardly extending guide surface presented toward said cam-follower and being so disposed as to be engageable by said follower when moved by said cam element, said cam element being so formed as to provide a follower-engaging surface comprising a pair of relatively upper and lower substantially horizontal lands which are relatively transversely interspaced, and a substantially steeply inclined cam surface extending between most nearly adjacent ends of said lands, a second spring constantly exerting pressure tending to move said mount in a single vertical direction, and said mount projection interchangeably adjustable by opposite lateral adjustment movements of said cam element to make pressure engagement with either of said lands responsive to pressure of said second spring, and said follower upon movement of said cam in at least one lateral direction of movement adapted to be simultaneously engaged on its two sides by relatively converging portions of said cam and guide surfaces whereby continued adjustment movement of the cam element against said follower is effective to force said follower and said mounted wheel to a different level against the opposing pressure of said second spring.

2. In a change speed adjustment mechanism for two-speed phonograph turntable drives of the type described, the combination with an upright motor driven roller having a pair of superposed friction driving steps of different diameters, a friction wheel rotatable on a vertical axis adapted to alternately peripherally engage and be driven by one or the other of said steps, a laterally and vertically movable mount for said wheel, a first spring continuously exerting pressure tending to move said mounted wheel towards peripheral engagement with that roller step which at the time is disposed at the same level as said wheel, means for adjusting said wheel mount laterally beyond said steps and from the level of either of said steps, said adjustment means comprising a laterally movable cam element adapted to be moved laterally in a continuous uniform path, a projection of said wheel mount being disposed in the path of movement of said cam element and affording a cam follower therefor, and a relatively stationary abutment member having an upwardly extending guide surface presented toward said cam-follower and being so disposed as to be engageable by said follower when moved by said cam element, said cam element being so formed as to provide a follower-engaging surface comprising a pair of relatively upper and lower substantially horizontal lands which are relatively transversely interspaced, and a substantially steeply inclined cam surface extending between most nearly adjacent ends of said lands, a second spring constantly exerting pressure tending to move said mount in a single vertical direction, said follower adapted to be interchangeably moved to engage one or the other of said lands, and each land adapted to prevent further movement of said mount responsive to the pressure of said second spring, said follower adapted to be disengaged from its pre-engaged land responsive to appropriate movement of said cam element in the transverse direction to effect engagement by said follower with said cam surface, and said upwardly extending abutment guide surface adapted to limit lateral movement of said follower when in engagement with said cam surface whereby with said cam element moving in one direction said follower is forced to move to the alternate level by the effect of said second spring while simultaneously engaged by said guide and cam surfaces, relatively so disposed as to define a V-slot by virtue of their convergence, said slot being progressively varied in depth according to the degree of lateral movement of the cam surface thereof.

3. In a motor driven friction transmission for phonograph turntables of the type comprising a pendant tubular flange, a motor shaft formed to provide a pair of relatively stepped axially aligned annular friction pulley steps of different diameters, an idler wheel adapted for interchangeable positioning at different levels for interengagement with said flange and either selected one of said steps, a first spring yieldably urging said wheel laterally toward concurrent peripheral engagement with said flange and either pulley step, a second spring resiliently tending to move said wheel vertically from one to the other of said levels, an idler wheel adjustment mechanism comprising a pair of interengageable camming members including a manually adjustable camming member adapted solely for lateral movement and being so formed as to afford an upwardly inclined cam surface, a second member adapted for horizontal and vertical movements responsive to engagement by said cam surface being adapted to receive combined vertical and horizontal components of thrust therefrom, and a relatively stationary upwardly extending guide element engageable by said second member when thrust horizontally by said camming member and reactively effective thereto to limit the resulting horizontal movement of said second member to a predetermined degree, whereby said second member is subsequently moved vertically against the opposing pressure of said second spring by the effect of the vertical component of thrust exerted by said camming member, said second spring being subsequently effective to exert a restoring effort on said second member exerted in the relatively opposite vertical direction responsive to subsequent relatively reversed horizontal adjustment movement of said camming member, and said guide and camming member being cooperatively adapted to guide said follower during its restoring movement in said opposite vertical direction, and means resultantly operable to transmit movements of said second member to said wheel to move it in substantially corresponding directions responsive to the recited movements of said second member, and said first spring adapted to effect peripheral engagement of said wheel with either step to the level of which said wheel is moved by said second member.

4. In a motor driven friction transmission for phonograph turntables of the type having a pendant tubular flange, a motor shaft formed to provide a pair of relatively stepped axially and vertically aligned annular friction pulley steps of different diameters, an idler wheel adapted for selective positioning at different levels for interengagement with said flange and either selected one of said steps, a first spring yieldably urging said wheel laterally toward concurrent engagement with said flange and either pulley step which is disposed at the selected level of said wheel, a second spring resiliently tending to move said wheel vertically from one to the other of said levels, an idler wheel adjustment mechanism comprising a first member secured in movement transmitting relationship to said wheel and a second member manually movable in opposite lateral directions, one of said members comprising an upwardly inclined camming surface and a substantially horizontal land extending laterally from at least one end thereof, said land in a first relative adjustment position of said members adapted to be engaged with the other member to maintain said wheel at a first of said levels in opposition to the effect of said second spring, said first member responsive to a manually effected horizontal movement of said second member in one lateral direction adapted to effect disengagement of said land with said other member and engagement of said other member with said inclined surface, and said second spring adapted during engagement of said inclined surface with said other member to so move said first member in such vertical direction as to cause it to move said wheel to the alternate level, and said manually movable member adapted, responsive to reversed manually effected transverse movement thereof, to effect a relative camming action between the said camming surface and the said other member to cause said first member and said wheel to be restored to the above said first said level, and a relatively stationary vertical guide element adapted to restrain said first member and said wheel from more than a predetermined degree of lateral movement during relative camming engagement between the members.

5. In a two speed drive for phonograph turntables having a pendant annular flange of the type employing a vertical driving roller having two superposed roller step portions disposed horizontally within the vertical extent of said flange and having a horizontally and vertically movable idler wheel interchangeably disposable at the upper and lower levels of the respective roller steps, manually operable mechanism for so interchangeably positioning said idler wheel comprising a first spring constantly resiliently exerting pressure tending to move said wheel in one vertical direction and a second spring constantly resiliently tending to move said wheel inwardly to engage that one of said steps at whose level said wheel is currently disposed and comprising a manually operable member movable solely in either horizontal opposite direction in a path of like directional nature throughout, a second member in motion transmitting relation to said wheel and being so interlinked with said first member that when said first member is moved in one horizontal direction it is adapted to communicate horizontal and vertical components of thrust to said second member, the vertical component thereof being in opposition to the resilient effort of said second spring, and a relatively stationary element for limiting the extent of lateral movement of said second member responsive to the thrust exercised thereon by said first member and affording a vertical guide for subsequent resultant vertical movement of said second member, and said stationary element and first member cooperatively operable responsive to reversed horizontal movement of said first member to guidingly restore said first member to its original level by reversed vertical and horizontal movements by the retractile effort exercise on said second member by said second spring.

6. In a two speed drive for phonograph turntables having a pendant annular flange of the type employing a vertical driving roller having two superposed roller step portions disposed horizontally within the vertical extent of said flange and having a horizontally and vertically movable idler wheel interchangeably disposable at the upper and lower levels of the respective roller steps, manually operable mechanism for so interchangeably positioning said idler wheel comprising a first spring constantly resiliently exerting pressure tending to move said wheel in one vertical direction and a second spring constantly resiliently tending to move said wheel inwardly to engage that one of said steps at whose level said wheel is currently disposed and comprising a manually operable member movable solely in either horizontal opposite direction in a path of like directional nature throughout, a second member in motion transmitting relation to said wheel and movable responsive to a horizontal movement of said first member in a horizontal direction and in a vertical direction to resultantly move said wheel outwardly from engagement with a pre-engaged step, then to move said wheel upwardly to the level of the alternate step, and then to free said wheel for lateral movement inwardly to effect peripheral engagement thereof with said alternate step, in combination with a relatively stationary vertical guide engageable by said second member to limit its said horizontal outward movement and to convert the effort to resultantly move the second member vertically along a straight vertically extending path, and said second spring adapted responsive to reversed horizontal movement of said first member to restore said second member and said wheel to their original levels under the guiding control of said stationary guide and said first member.

7. In a motor driven friction transmission for phonograph turntables of the type comprising a pendant tubular flange, a motor shaft formed to provide a pair of relatively stepped axially aligned superposed annular friction pulley steps of different diameters, an idler wheel adapted for interchangeable positioning at different levels for interengagement with said flange and either selected one of said steps, a first spring yieldably urging said wheel laterally toward concurrent engagement with said flange and that pulley step at whose level the wheel may be positioned, a second spring resiliently tending to move said wheel vertically from one to the other of said levels, an idler wheel adjustment mechanism comprising a wheel adjustment mechanism comprising a first member adapted for both horizontal and vertical movements disposed in motion transmitting relation to said wheel, a second solely transversely and manually movable member adapted to simultaneously exert vertical and horizontal components of thrust effort on the first member with an initial predominance of horizontal thrust effort, and a stationary upwardly extending guide element adapted to restrain said first member from moving laterally substantially more than such a predetermined amount which is sufficient to laterally displace said wheel periphery from the pre-engaged roller step and laterally beyond the roller step of greater diameter, in response to the exertion of said thrust components by said second member by said first member, whereby continued lateral movement of said second member is solely effective to vertically move said first member to cause said wheel to move to the vertical plane of the alternate step against the opposing pressure of said second spring, and said first and second members being so formed and interengaged that, responsive to a predetermined amount of said vertical movement by said first member it is released by said second member to permit said spring to so move said wheel laterally as to effect peripheral engagement by said wheel, with said alternate roller step.

8. In a motor driven friction transmission for phonograph turntables of the type comprising a pendant tubular flange, a motor shaft formed to provide a pair of relatively stepped axially aligned superposed annular friction pulley steps of different diameters, an idler wheel adapted for interchangeable positioning at different levels for interengagement with said flange and either selected one of said steps, a first spring yieldably urging said wheel laterally toward concurrent engagement with said flange and that pulley step at whose level the wheel may be positioned, a second spring resiliently tending to move said wheel vertically from one to the other of said levels, an idler wheel adjustment mechanism comprising a wheel adjustment mechanism comprising a first member adapted for both horizontal and vertical movements disposed in motion transmitting relation to said wheel, a second solely transversely and manually movable member adapted to simultaneously exert vertical and horizontal components of thrust effort on the first member with an initial predominance of horizontal thrust effort, and a stationary upwardly extending guide element adapted to restrain said first member from moving laterally substantially more than such a predetermined amount which is sufficient to laterally displace said wheel periphery from the pre-engaged roller step and laterally beyond the roller step of greater diameter, in response to the exertion of said thrust components by said second member by said first member, whereby continued lateral movement of said second member is solely effective to vertically move said first member to cause said wheel to move to the vertical plane of the alternate step against the opposing pressure of said second spring, and said first and second members being so formed and interengaged that, responsive to a predetermined amount of said vertical movement by said first member it is released by said second member to permit said spring to so move said wheel laterally as to effect peripheral engagement by said wheel with said alternate roller step, and said members and element cooperatively adapted to guide said first member in a subsequent reversed vertical movement and succeeding lateral movement responsive to reversed lateral movement of said second member, by power, successively applied respectively by said second and first springs whereby said wheel is restored to the level of the said pre-engaged roller step and to peripheral re-engagement therewith.

9. The combination of a pendant annular flange of a turntable, a driving roller having two superposed friction driving steps of different diameters, an idler wheel peripherally engageable at different levels with either of said steps and concurrently with a lateral surface of said flange, a first spring continuously biasing said wheel laterally towards said roller and a second spring continuously biasing said wheel in one vertical direction, a manually movable wheel adjustment member adapted solely for lateral adjustment movement, means comprising an abutment guide operable responsive to a solely lateral movement of said member of predetermined extent adapted to successively move said wheel laterally outwardly from either pre-engaged of said steps and then vertically to the level of the alternate step and to subsequently release the wheel for lateral movement by said first spring, said adjustment member adapted for a relatively greater adjustment movement in one lateral direction, and other means associated with the said means adapted, responsive to said greater lateral adjustment movement of said member, to move said wheel to an inoperative position disposed laterally outward from and out of engagement with either roller step, and yieldable retaining means for releasably retaining said wheel in said inoperative position.

10. Mechanism for adjusting an idler wheel to peripheral concurrent engagement with either of a pair of relatively superposed driving rolling steps of different diameters and with an annular flange of a phonograph turntable, comprising a manually operable member movable solely in either horizontal opposite direction in a path of uniformly like directional nature throughout, a second member in motion-transmitting relation to said wheel and so interlinked with the first member as to adapt said first member to exert both vertical and horizontal components of thrust on said second member when said first member is moved in one horizontal direction, and means comprising an abutment guide adapted to transform a preliminary lateral movement of said second member, imparted thereto by said first member when so moved, into a vertical movement, whereby said first member first effects a lateral movement of said second member adapted to cause it to withdraw said wheel from prior engagement with one of said steps, and whereby said first member then vertically moves said second member to cause it to move said wheel to the level of the other step, and spring means adapted to move said wheel laterally inwardly to peripheral engagement with that step to whose level said wheel is vertically moved, and to restore said second member and said wheel to their original levels responsive to a relatively reversed horizontal restoring movement of said first member.

11. The combination of a pendant annular flange of a turntable, a driving roller having two superposed friction driving steps of different diameters, an idler wheel peripherally engageable at different levels with either of said steps and concurrently with a lateral surface of said flange, a first spring continuously biasing said wheel laterally towards said roller and a second spring continuously biasing said wheel in one vertical direction, and manually operable means for moving said wheel in a rectilinearly changing path out of engagement with one of said roller steps, then to the level of the other step and to engage said wheel with said other step comprising a manually adjustable first element reciprocably movable in a path of unchanging directional character throughout, a second element in motion transmitting relation to said wheel engageable by said first element and movable thereby and an abutment guide third element engageable by the so moved second element and adapted to change the direction of movement of said second element whereby said wheel is moved outwardly from a preengaged roller step, then guided vertically to the level of the other step and moved inwardly to engage the alternate roller step responsive to the retractile effort of said first spring.

12. The combination of a pendant annular flange of a turntable, a driving roller having two superposed friction driving steps of different diameters, an idler wheel peripherally engageable at different levels with either of said steps and concurrently with a lateral surface of said flange, a first spring continuously biasing said wheel laterally towards said roller and a second spring continuously biasing said wheel in one vertical direction, and means to shift said wheel in a substantially U-shaped rectilinear path from engagement with a preengaged roller step to engagement with the alternate step comprising a first element reciprocably manually adjustable to move in a path of like directional nature throughout, a second element in motion transmitting relation to said wheel and engageable by said first element, and a third element adapted for engagement by said second element responsive to movement of said second element by said first element to change the direction of movement of said second element to shift said wheel to a different level whereby said first spring is adapted to retract said wheel inwardly to cause it to peripherally engage said step.

13. The combination of a pendant annular flange of a turntable, a driving roller having two superposed friction driving steps of different diameters, an idler wheel peripherally engageable at different levels with either of said steps and concurrently with a lateral surface of said flange, a first spring continuously biasing said wheel laterally towards said roller and a second spring continuously biasing said wheel in one vertical direction, and means to shift said wheel in a substantially U-shaped rectilinear path from engagement with a preengaged roller step to engagement with the alternate step comprising a first thrusting and camming element, a second element engageable by said first element and movable thereby, and a third abutment guide element engageable by said second element, said first element solely movable in a planular path of uniform directional nature throughout said second element disposed in said path and adapted for movement responsive to engagement by said first element and said guide element adapted for engagement by said moving second element to abruptly change its direction of movement and said second element in motion transmitting relation to said wheel to cause said wheel to partake of movements corresponding to the movements of said second element.

14. The combination of a pendant annular flange of a turntable, a driving roller having two superposed friction driving steps of different diameters, an idler wheel peripherally engageable at different levels with either of said steps and concurrently with a lateral surface of said flange, a first spring continuously biasing said wheel laterally towards said roller and a second spring continuously biasing said wheel in one vertical direction, and manually actuatable means comprising said springs for adjusting said wheel along a rectilinear path to alternately peripherally engage a successively different one of said roller steps comprising a thrusting element manually reciprocably shiftable in opposite directions along a path of continuously like directional nature, a second element secured in motion transmitting relation to said wheel, and an abutment guide element, said second element movable responsive to thrust efforts exerted thereon by said thrusting element, and said guide element adapted for engagement by said second element to change its initial direction of movement.

CHARLES E. EWING.

REFERENCES CITED

The following references are of record in the file of this patent:

UNITED STATES PATENTS

| Number | Name | Date |
|---|---|---|
| 2,139,560 | Olson | Dec. 6, 1938 |
| 2,281,665 | Brady | May 5, 1942 |